Patented Dec. 16, 1952

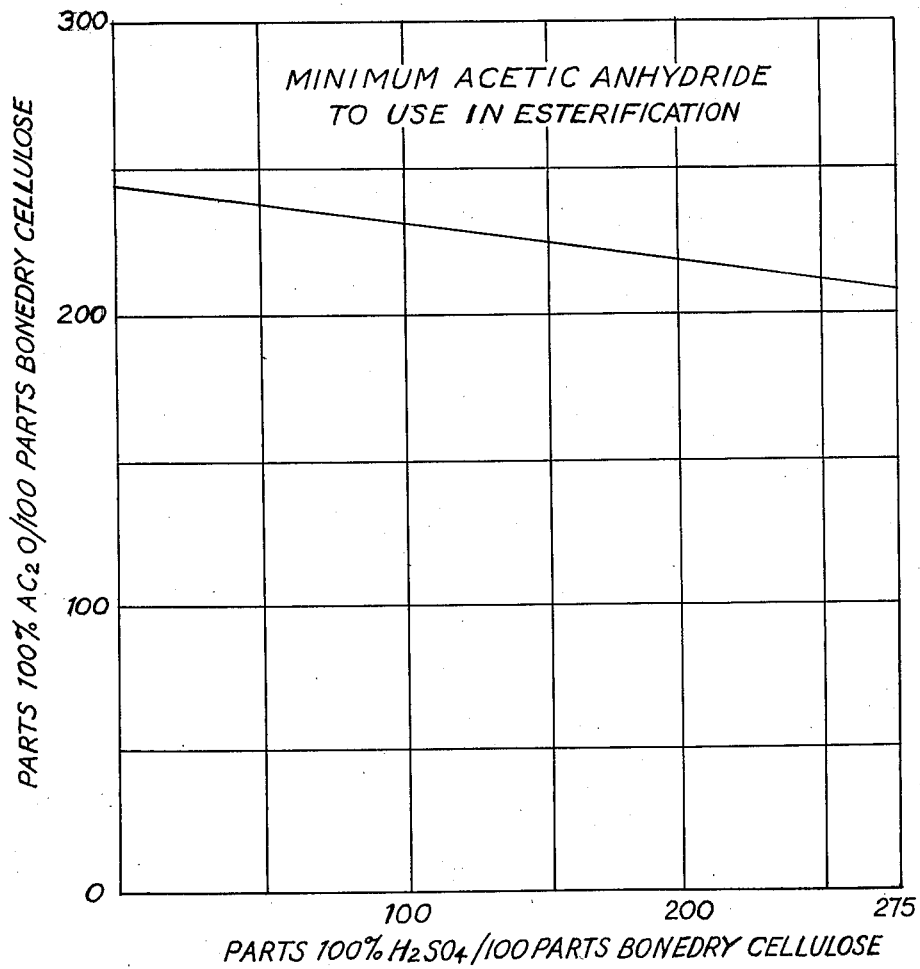

2,622,079

UNITED STATES PATENT OFFICE 2,622,079

PROCESS FOR THE MANUFACTURE OF CELLULOSE ACETATE SULFATE IN FIBROUS FORM

Carlton L. Crane, Rochester, N. Y., assignor to Eastman Kodak Company, Rochester, N. Y., a corporation of New Jersey Application December 8, 1950, Serial No. 199,893

6 Claims. (Cl. 260—215)

This invention relates to the process for the manufacture of cellulose acetate sulfate in a fibrous form featuring the presence of sodium acid sulfate or its equivalent in the esterification mass.

The method of preparing cellulose acetate sulfates was described and claimed in my U. S. Patent No. 2,582,009, dated January 8, 1952, in which method the product which results is in solution in the esterification mass. With some types of cellulose acetate sulfates, conditions in the process of making by the method of my earlier application are critical. Therefore, the conditions of operation may be difficult to control when preparing solutions of cellulose acetate sulfates having high sulfur content and a high viscosity by that described method. I have found, however, that if cellulose acetate sulfates are prepared in the presence of an acid salt of sulfuric acid in a substantial amount the cellulose acetate sulfate does not go into solution in the esterification bath and that the process of preparing that ester can be run without difficulty even in the case of high sulfate content products.

One object of my invention is to provide a method of preparing cellulose acetate sulfates. Another object of my invention is to provide a method of preparing cellulose acetate sulfates which is featured by easy temperature controls. Another object of my invention is to provide a process of preparing cellulose acetate sulfates involving the use of alkali metal salts in the esterification process. Other objects of my invention will appear herein.

In its broadest aspects my invention comprises acting upon cellulose with lower fatty acid anhydride and sulfuric acid with a bath which also contains a considerable proportion of bisulfate therein so as to render the bath non-solvent of the cellulose ester product which is prepared thereby. I have found that by esterifying cellulose in baths in which 33–275 parts of sulfuric acid ion is present and a considerable proportion of that ion is in the form of sulfuric acid itself that cellulose acetate sulfates are obtained having a sulfur content of 5–13.5% which products exhibit good stability. It has been previously supposed in the art that the presence of combined sulfur in cellulose acetates renders those esters unstable. I have found, however, that stable cellulose esters are prepared in accordance with my invention, even though substantial percentages of sulfur in the form of sulfate radicals are present.

The cellulose which is to be esterified in accordance with my invention is desirably activated by some method such as is employed at the present time for the activation of cellulose prior to acetylation. The cellulose may be activated by presoaking in glacial acetic acid, followed by the addition of a solution of sulfuric acid in acetic acid thereto, or it may be activated by first soaking with water and replacing that water with glacial acetic acid. Useful methods for pretreating cellulose are those described in U. S. Patents Nos. 2,150,690 and 2,342,415 of Malm and 2,487,892 of Richter and MacClaren.

My invention comprises esterifying cellulose with a mixture of lower fatty acid anhydride and $SO_4$ ion in which a considerable proportion of the $SO_4$ ion is present as bisulfate. For instance, 100 parts of cellulose is esterified with a bath containing 33–275 parts of $SO_4$ ion, some as acid and the remainder as acid salt, an amount of lower fatty acid anhydride of at least that shown in the attached graph together with sufficient lower fatty acid to act as the diluent. The line of the attached graph may be represented mathematically approximately by the equation $$Y = 245 - .135X$$

wherein Y represents the parts of 100% acetic anhydride per 100 parts of cellulose, and X represents the parts of 100% sulfuric acid per 100 parts of cellulose. The proportion of lower fatty acid and anhydride to cellulose in the bath should be 4.8–13:1. If the sulfate ion is added in the form of sulfuric acid there is also added to the esterification mass a basic material so as to neutralize to bisulfate all the sulfuric acid except that which is needed to catalyze the esterification. Ordinarily in the bath in accordance with my invention 50–95% of the $SO_4$ ion should be combined form as the acid sulfate and 5–50% of the $SO_4$ ion should be in the form of free sulfuric acid. Instead of adding all of the $SO_4$ ion to the bath in the form of sulfuric acid followed by incomplete neutralization a portion of that ion can be added as the bisulfate so that the esterification mixture can be prepared in the form in which it is eventually desired or some of the bisulfate necessary may be in situ by adding base to the mass and the remainder can be supplied in the form of the bisulfate.

The neutralizing material which has been found to be particularly useful is sodium acetate, as upon reacting with sulfuric acid this salt leaves acetic acid in the bath. Other neutralizing materials can be employed such as sodium carbonate, sodium hydroxide or the like but in the case of those bases, water is also formed as a result of the reaction the presence of which is wasteful of acid anhydride. The bases which can be used are any of the alkali or alkaline earth metal salts of weak acids or the hydroxides of those metals. Some compounds which are particularly useful are those of sodium, potassium, lithium, lead, copper and zinc.

The process of preparing cellulose acetate sulfates in accordance with my invention is carried out in a stepwise manner in that not all of the esterification mass is mixed with the cellulose at one time. For instance, the cellulose is preferably subjected to a treatment whereby it is made readily reactive to esterifying reagents. The so treated cellulose ordinarily is obtained mixed with acetic or some other lower fatty acid. There is then mixed with the cellulose, acetic anhydride so as to remove the water present and assure an anhydrous condition of the esterification mass. There is then added either a sodium bisulfate if that is the material to be added or if the $SO_4$ ion is to be added in acid form sulfuric acid plus the required amount of sodium acetate or other neutralizing agent to form the bisulfate. Thereupon is added the esterifying or main part of the acetic anhydride, which anhydride gives best results when added at a temperature of 10–40° F. The anhydride dissolves in the mass, the temperature of which is no more than 70° F. and preferably 50° F. or lower. If a high viscosity ester is contemplated it is desirable that the mass be at a temperature of 50° F. or lower. Thereupon is added the sulfuric acid in sufficient amount to promote the esterification. The addition of the sulfuric acid which promotes the esterification is accompanied by cooling of the entire mass so that the temperature of the mass does not exceed 70° F. at the time of the addition of the acid and for 15 minutes thereafter or until the initial temperature rise caused by this addition is under control. Otherwise the final product obtained will be of inferior quality. If a high viscosity product is desired, the temperature of the mass upon the sulfuric acid addition should be restricted so as not to exceed 40° F. until the vigor of the reaction induced thereby has subsided. After the vigor of the reaction has subsided, the temperature may be allowed to rise such as because of further action occurring. After the product has been formed, basic material is added to the mass to neutralize the sulfuric acid in the mass and it is then centrifuged and washed such as with isopropanol to remove any of the reactants which may be present thereon.

My process is adapted for preparing esters of both high and low viscosity or if desired esters of intermediate viscosity may be prepared thereby. Ordinarily for the preparation of high viscosity esters a lesser proportion of free sulfuric acid is desirable than in those processes in which a lower viscosity ester is desired. For example, if the esterification mass is to be allowed to rise to a temperature within the range of 65–75° F. and a high viscosity ester is to be obtained the ratio of free $SO_4$ ion to combined $SO_4$ ion should be approximately 4–5:50. If on the other hand a low viscosity ester is desired and the maximum temperature is 65–70° F. the ratio of free $SO_4$ ion to combined $SO_4$ ion should be 20:35–80. For medium viscosity esters ratios intermediate those for the high and low viscosities should be used. It is desirable in processes in accordance with our invention that the maximum temperature be found within the range of 60–80° F.

*Example I*

300 parts of undried cotton linters were loaded into a jacketed sigma bladed-type mixer together with 720 parts of glacial acetic acid and mixed for 1 hour to 96° F. maximum temperature.

A mixture of 475 parts of glacial acetic acid and 2.21 parts of concentrated sulfuric acid were then added to the mixer and the mixture was cooled to 65° F. over 10 minutes; 85 parts of 97% acetic anhydride were then added to the mixture and the mass was cooled for 15 minutes.

150 parts of anhydrous sodium acetate were then added and the mass was mixed for 5 minutes with cooling water in the jacket of the mixer.

720 parts of 97% acetic anhydride were mixed with 600 parts of glacial acetic acid and the mass was cooled below 40° F.; to this mixture a cooled mixture of 218.6 parts of concentrated sulfuric acid and 150 parts of glacial acetic acid were added at such a rate that the temperature of the mixture did not exceed 40° F. The solution was then cooled to 16° F. and added to the mixer over 30 minutes. The reaction temperature was allowed to rise from 50 to 55° F. during this addition, and then to 70° F. over 2 hours and mixing was continued for 4½ hours at 70° F.

600 parts of glacial acetic acid containing 40 parts of anhydrous sodium acetate were added to the mixer over 30 minutes.

The fibrous mass was centrifuged as free of acid as possible and washed in changes of isopropanol until a sample of the product dissolved in water gave a pH value of 3.9.

The white fibrous product obtained was then slurried in 10 parts of 99% isopropanol and an aqueous solution of sodium carbonate was added until the pH of a test sample dissolved in distilled water gave a value of from 6 to 7.

The product was centifuged and dried at 140° F.

The product obtained had the following analysis:

Sulfur _____ 8.6%
Acetyl _____ 23.2%
Viscosity in distilled water at 4% concentration at 25° C. _____ 55.1 cps. at pH 7.1

*Example II*

1.56 parts of cotton linters were slurried in distilled water for 24 hours. The water was displaced by successive changes of acetic acid and the product centrifuged until the cellulose retained 1 part of acetic acid for each part of cotton linters.

The activated linters were placed in a jacketed sigma blade mixer together with 0.775 part of $NaHSO_4$ and 8 parts of acetic acid and the mass was cooled to 65° F. 4.06 parts of 40° F. 97% acetic anhydride were then added to the mixer and the mixture was stirred for 5 minutes with cooling water in the jacket of the mixer. A mixture consisting of 0.58 part of acetic acid and 0.0855 part of concentrated sulfuric acid were added to the bath. The temperature of the reaction was maintained at 70° F. for 2 hours after which time the product was soluble in water.

A mixture consisting of 0.068 part of sodium acetate and 0.8 part of acetic acid were added to the bath and the mass stirred for ½ hour.

The fibrous product was then centrifuged as free of acid as possible and washed in successive changes of isopropanol until the product was essentially free from uncombined acids.

The white fibrous material was then slurried in 15 parts of 85% isopropanol and 10% NaOH was added until the pH of a test sample dissolved in distilled water gave a value of 6.5. The product was then centrifuged, washed in one change of fresh isopropanol and dried at 120° F.

A sample of the dry product dissolved in distilled water at 3% concentration gave a viscosity of 460,000 Cps. at 25° C., pH 4.2.

*Example III*

250 parts of cotton linters containing 4.4% moisture were placed in a sigma bladed jacketed mixer together with 600 parts of acetic acid and the mixture was presoaked one hour to a maximum temperature of 96° F.

A mixture of 190 parts of acetic acid and 1.8 parts of concentrated sulfuric acid were added to the bath and the temperature reduced to 65° F.

70 parts of 97% acetic anhydride were then added to the mixer and the mass was stirred for 15 minutes at 60° F.

A slurry consisting of 642 parts of concentrated sulfuric acid, 512 parts of sodium acetate and 134 parts of acetic acid was added to the mixer and the mass stirred for 5 minutes with cooling water in the jacket of the mixer.

896 parts of 24° F. 97% acetic anhydride were added to the mixer and the mass stirred for 10 minutes during which time the temperature rose to 68° F. A mixture consisting of 25 parts of acetic acid and 46.5 parts of concentrated sulfuric acid was added to the mixer and the temperature maintained at 70° F. for 5⅜ hours. A mixture of 110 parts of sodium acetate and 1100 parts of acetic acid was then added to the mixer over a 15-minute interval with cooling.

The fibrous mass was centrifuged to remove excess acid and washed in successive changes of isopropanol until the product was essentially free from uncombined acids. The white fibrous product was slurried in 3600 parts of 90% isopropanol and a 10% aqueous solution of sodium carbonate was added to the slurry until a small test sample dissolved in distilled water gave a pH value of 6. The product was centrifuged, washed in isopropanol and dried at 140° F. The ester analyzed as follows:

| | Percent |
|---|---|
| Sulfur | 13.4 |
| Acetyl | 12.5 |

*Example IV*

Cotton linters were boiled in distilled water for 1 hour then dehydrated with successive changes of acetic acid.

520 parts of a mixture consisting of 300 parts cellulose and 220 parts 94.5% acetic acid were placed in a sigma blade, jacketed mixer together with 730 parts of acetic acid and 3.12 parts of concentrated sulfuric acid. The temperature was reduced to 65° F. and 85 parts of 97% acetic anhydride were added to the mixer. The mass was stirred for 15 minutes and the temperature was maintained at 60–65° F. during the interval. A mixture consisting of 830 parts acetic acid, 51.2 parts Li$_2$CO$_3$ and 144.8 parts of concentrated sulfuric acid was added to the mixture and the mass stirred for 15 minutes with cooling. 845 parts of 22° F. 97% acetic anhydride were added to the reaction mixture over ½ hour during which time the temperature of the bath was reduced to 46° F. A mixture consisting of 18.9 parts of concentrated sulfuric acid and 50 parts of acetic acid were added to the mixer. The reaction temperature was maintained at 45° F. for ½ hour then allowed to rise to 75° F. over 2 hours.

A mixture consisting of 18.8 parts Li$_2$CO$_3$ and 300 parts of acetic acid were added to the mixer over ½ hour and the slurry was stirred for an additional period of 15 minutes.

The product was centrifuged as free of acid as possible and washed in successive changes of n-butanol until essentially free from uncombined acids. The fibrous white product was dissolved in methanol and reprecipitated in ether. The precipitate was washed twice in ether and dried at 140° F. The product analyzed as follows:

| | |
|---|---|
| Sulfur | 6.9%. |
| Acetyl | 28.0%. |
| Viscosity in distilled water at 5% concentration at 25° C. | 1395 cps. at pH 4.2. |

*Example V*

250 parts of undried cotton linters containing 4.8% moisture together with 600 parts of acetic acid were placed in a sigma blade, jacketed mixer and presoaked one hour to a maximum temperature of 96° F. A mixture consisting of 290 parts of acetic acid and 1.8 parts of concentrated sulfuric acid was added to the bath and the temperature reduced to 65° F. 70 parts of 97% acetic anhydride were added to the mixer and the temperature reduced to 56° F. over ¼ hour. A slurry consisting of 298 parts concentrated sulfuric acid, 237.5 parts sodium acetate, and 369.5 parts acetic acid were added to the mixer. After 5 minutes the temperature rose to 58° F. Successive additions were made to the mixer of 760 parts of 28° F., 97% acetic anhydride and a mixture consisting of 36.5 parts acetic acid, 67 parts concentrated sulfuric acid.

The temperature was allowed to rise to 72° F. over 4 hours. Cooling water was circulated through the jacket of the mixer and a mixture consisting of 90 parts of sodium acetate and 700 parts acetic acid were added to the bath over 15 minutes.

The fibrous product was centrifuged and washed in successive changes of isopropanol until essentially free from uncombined acids. The fibrous product was slurried in 2000 parts of a 9:1 mixture of isopropanol-distilled water. An aqueous 20% solution of sodium carbonate was added until a test portion of the product dissolved in distilled water gave a pH of 6–7.

The product was centrifuged and dried at 140° F. The product analyzed as follows:

| | |
|---|---|
| Sulfur | per cent__ 10.3 |
| Acetyl | do_____ 13.5 |
| Viscosity in distilled water at 10% concentration at 25° C | cps__ 119 |
| pH | 7.2 |
| After boiling 7 hours under reflux, viscosity | cps__ 69.8 |
| pH | 5.5 |

*Example VI*

Cotton linters were boiled in distilled water for one hour then dehydrated with successive changes of acetic acid. 370 parts of treated linters consisting of 300 parts of linters and 70 parts of 90% acetic acid were placed in a jacketed sigma blade type mixer together with 1340 parts of acetic acid and the mixture was cooled to 63° F.

A mixture consisting of 170 parts of cupric acetate, 460 parts acetic acid and 192.5 parts concentrated sulfuric acid was added to the mixer and the temperature reduced to 60° F. over a 5 minute period. 840 parts of 16° F., 97% acetic anhydride were added to the mixer over a 30 minute period during which time the temperature was reduced to 48° F. A mixture consisting of 27.5 parts concentrated sulfuric acid and 50 parts acetic acid was added to the mixer.

The reaction temperature was maintained at 48° F. for ½ hour then allowed to rise to 69° F. over 2¾ hours. A sample of the esterification solution dissolved in equal parts of distilled water gave a viscosity of 70 seconds.

25 parts of cupric acetate were added to the mixer and the slurry was stirred for 15 minutes during which time the temperature was reduced to 58° F. The temperature of the slurry was then allowed to rise to 70° F. and additional portions of 5 parts of cupric acetate were added to the slurry until a total of 40 parts were added. A test sample of the reaction solution gave a blue-green coloration with crystal violet indicator dissolved in glacial acetic acid.

The fibrous mass was centrifuged to remove excess uncombined acids and washed in successive changes of isopropanol until a test portion of the final product dissolved in distilled water gave a pH value of 5.2. The product was dried at room temperature.

*Example VII*

Cotton linters were boiled in distilled water for one hour then centrifuged and treated with successive changes of acetic acid.

448 parts of the activated cotton linters consisting of 300 parts of linters and 148 parts of 99.8% acetic acid together with 1202 parts of acetic acid were placed in a jacketed sigma blade mixer and cooled to 65° F. A slurry consisting of 172.5 parts of zinc acetate dihydrate, 460 parts of acetic acid and 183 parts of concentrated sulfuric acid was added to the mixer. The mass was agitated for 5 minutes and the temperature was reduced from 65° F. to 59° F. 840 parts of 16° F., 97% acetic anhydride were added to the mixer over ½ hour. A mixture consisting of 28.5 parts concentrated sulfuric acid and 50 parts acetic acid was added to the mixer. The temperature of the reaction was maintained at 51° F. for ½ hour, then allowed to rise to 70° F. over 1½ hours and was maintained at 70° F. for 4¾ hours. At the end of this time a sample of the esterification bath when dissolved in equal parts of distilled water gave an indicated viscosity of 37 seconds.

With cooling water in the jacket of the mixer, 37 parts of zinc acetate dihydrate were stirred into the bath for ¼ hour then the temperature was raised to 70° F. for ½ hour.

The product was centrifuged to remove excess uncombined acid, washed in successive changes of n-butanol and dried at room temperature.

The viscosity as referred to herein, unless designated otherwise, is determined as follows:

Weigh 20 gs. of the finished reaction mix into a small beaker and add 20 cc. of a mixture of equal parts by volume of acetic acid and tetrachloroethane from a burette. The addition should take place slowly at first, the solvent being thoroughly mixed with the dope. As the dope becomes thinner, the solvent may be added more rapidly. Upon completion of the mixing, the solution is poured into a 150 mm. test tube marked for viscosity determination and placed in a 25° C. bath. After the solution attains the temperature of the bath, the viscosity is determined by the ball-drop method. Where water soluble products are obtained, the determination is carried out using 20 gs. of esterification solution and 20 cc. of distilled water. The calibrations on the test tube are 10 cm. apart. The bead use to determine the viscosity is approximately ⅛-inch in diameter, being a Hercules standard cuprammonium viscosity glass bead.

To determine the stability of the water soluble cellulose acetate sulfate salt at the boiling point, enough of the mixture is weighed to prepare 300 gs. of solution in distilled water at the concentration desired (i. e., 1%, 2%, 5%, or 10%). The weighed sample is then placed in a Waring Blendor and distilled water is added to the desired concentration. The mixture is stirred until solution is complete, during which time the temperature of the solution will rise to about 60° C. When stirring is complete, the solution is transferred to a glass bottle and stopper. When the solution is bubble free, half of the solution is transferred to a round bottom flask equipped with a ground glass joint. The flask is placed in a sand bath on an electric heater, and a glass reflux condenser from 36–48 inches in length is attached thereto. The solution is heated to boiling and maintained at a gentle reflux for 7 hours. The solution is then cooled to room temperature and the flask and its contents are transferred to a 25° C. bath, together with the flask containing the remainder of the original solution. When the temperature becomes constant the pH value of each solution and the absolute viscosity at 25° C. in an Ostwald-Fenske pipette is determined.

The products of my invention are useful particularly for coatings of various types, the water soluble products being suitable for use for coating purposes where an easily removable coating is desired.

For butyryl and propionyl esters (i. e., where butyric or propionic anhydride is used) the accompanying graph is also indicative of the amount of lower fatty acid anhydride which should at least be employed.

I claim:

1. A method for preparing a mixed ester of cellulose of sulfuric acid and a lower fatty acid in fibrous form which comprises esterifying cellulose in a bath containing: (1) 33–275 parts of combined $SO_4$ per 100 parts of cellulose, 5–50 per cent of the $SO_4$ being in the form of free sulfuric acid and 95–50 per cent of the $SO_4$ being in the form of the acid sulfate; (2) lower fatty acid and anhydride, the ratio of the lower fatty acid and anhydride to cellulose being 4.8–13:1, the parts of lower fatty acid anhydride being at least that indicated by the equation $Y=245-.135X$, wherein Y is the parts of 100% acetic anhydride and X is the parts of 100% sulfuric acid per 100 parts of bone-dry cellulose, the maximum temperature of the reaction being within the range of 60–80° F., whereby the cellulose is esterified without becoming dissolved in the esterification mass.

2. A process for preparing cellulose acetate sulfate which comprises esterifying cellulose with an esterification bath containing: (1) 33–275 parts of combined $SO_4$ per 100 parts of cellulose, 5–50 per cent of the $SO_4$ being free sulfuric acid, and 95–50 per cent thereof being in the form of the acid sulfate; (2) acetic acid and anhydride, the proportion of acetic acid and anhydride to cellulose being within the range of 4.8–13:1, and the parts of acetic anhydride to cellulose being at least that indicated by the equation $Y=245-.135X$ wherein Y is the parts of 100% acetic anhydride and X is the parts of 100% sulfuric acid per 100 parts of bone-dry cellulose, the reaction being at a maximum temperature within the range of 60–80° F., whereby a product which does not dissolve in the esterification mass is obtained.

3. The method of claim 1, wherein the combined SO₄ ion is in the form of sodium acid sulfate, as the acid sulfate portion thereof.

4. The method of claim 1, wherein the combined SO₄ ion is in the form of lithium acid sulfate, as the acid sulfate portion thereof.

5. The method of claim 1, wherein the combined SO₄ ion is in the form of copper acid sulfate, as the acid sulfate portion thereof.

6. The method of claim 1, wherein the combined SO₄ ion is in the form of zinc acid sulfate, as the acid sulfate portion thereof.

CARLTON L. CRANE.

REFERENCES CITED

The following references are of record in the file of this patent:

UNITED STATES PATENTS

| Number | Name | Date |
| --- | --- | --- |
| 1,866,532 | Haskins | July 12, 1932 |
| 2,582,009 | Crane | Jan. 8, 1952 |